United States Patent [19]

Levesque, Jr. et al.

[11] Patent Number: 4,509,110
[45] Date of Patent: Apr. 2, 1985

[54] METHOD AND APPARATUS FOR DETECTING FAILURES IN A CONTROL SYSTEM

[75] Inventors: Adelard Levesque, Jr.; John P. Rembold, both of North Palm Beach, Fla.

[73] Assignee: United Technologies Corporation, Hartford, Conn.

[21] Appl. No.: 386,136

[22] Filed: Jun. 7, 1982

[51] Int. Cl.³ .............................................. G05B 17/00
[52] U.S. Cl. .................................. 364/153; 364/150; 364/161; 364/184; 318/563; 318/624
[58] Field of Search ............... 364/186, 184, 185, 187, 364/153, 150, 161; 318/565, 563, 624

[56] References Cited

U.S. PATENT DOCUMENTS

| | | | |
|---|---|---|---|
| 3,566,241 | 2/1971 | Ross | 364/161 |
| 3,778,696 | 12/1973 | Walters et al. | 318/565 |
| 3,874,407 | 4/1975 | Griswold | 364/161 |
| 4,118,792 | 10/1978 | Strager et al. | 364/184 |
| 4,209,734 | 6/1980 | Osder | 318/565 |
| 4,213,175 | 7/1980 | Kurihara | 364/161 |
| 4,214,301 | 7/1980 | Kurihara et al. | 364/185 |
| 4,249,238 | 2/1981 | Spang et al. | 364/185 |
| 4,313,165 | 1/1982 | Clelford et al. | 364/161 |
| 4,374,433 | 2/1983 | Kundler et al. | 318/563 |
| 4,415,966 | 11/1983 | Herzog | 364/184 |

Primary Examiner—Jerry Smith
Assistant Examiner—John R. Lastova
Attorney, Agent, or Firm—Stephen E. Revis

[57] ABSTRACT

A system for detecting the failure of a control system and its object includes a mathematical model of the control system and its object which continuously predicts the output of the object. An error signal is continuously calculated which is the difference between the model output and the actual output of the object. Error signals exceeding a predetermined minimum value or deadband are integrated; but the integral is reset to zero whenever the error signal value falls within a predetermined range indicative of normal steady state operating tolerances. If the value of the integral reaches a specified level before being reset to zero, a failure signal is triggered. This failure detection system can be made sensitive to relatively small error signals without triggering a false failure signal if the small error was the result of only a temporary problem or due to inaccuracies in model simulation.

6 Claims, 1 Drawing Figure

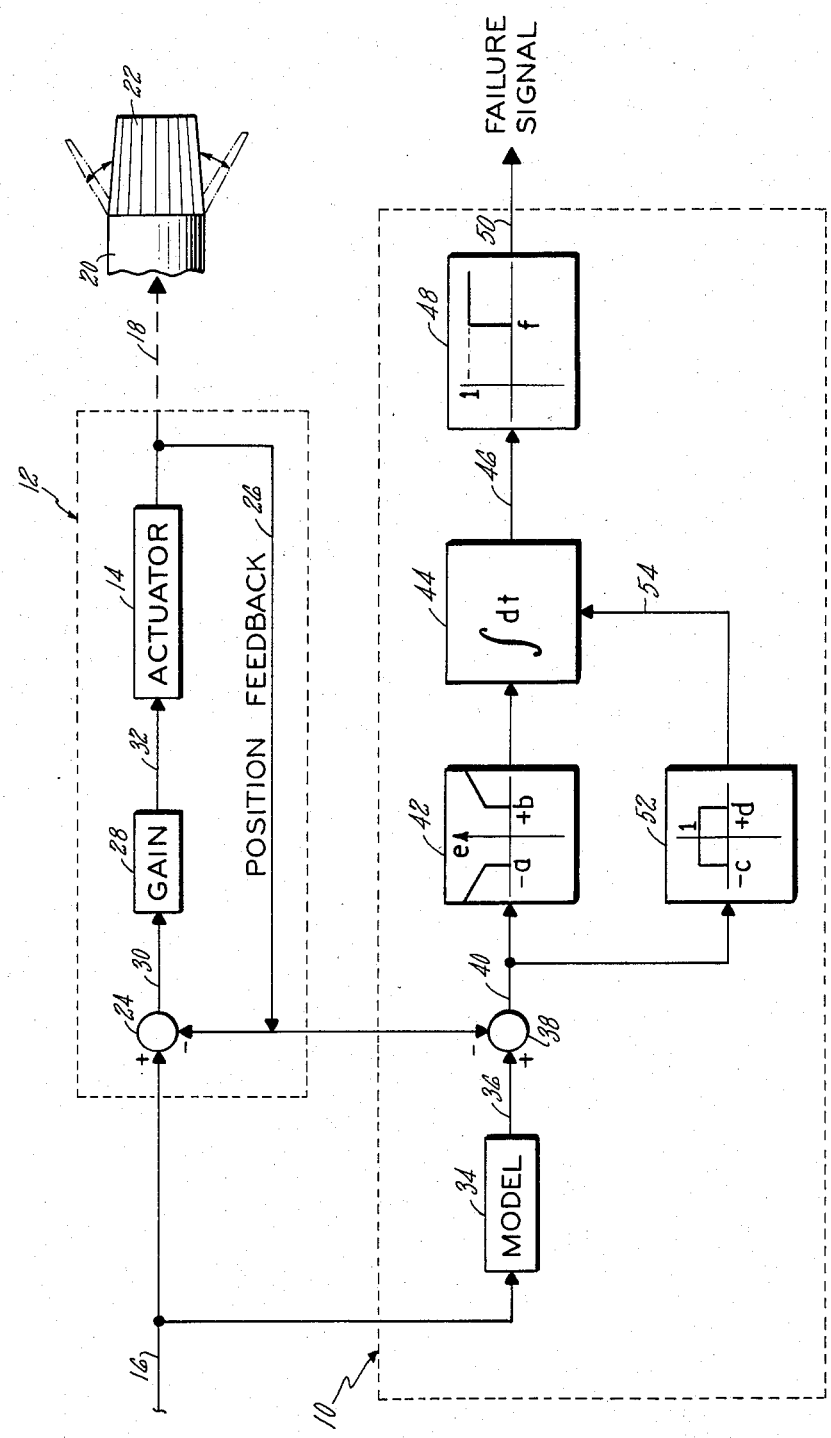

METHOD AND APPARATUS FOR DETECTING FAILURES IN A CONTROL SYSTEM

TECHNICAL FIELD

This invention relates to failure detection apparatus.

BACKGROUND ART

To detect whether a control system and the device which it controls (the object) is working properly it is known to compare the output or a feedback signal from the object to the output of a mathematical model having the input/output characteristics of the combined control and object and which receives the same input as the control. When the deviation or error between the actual output and the model output exceeds a predetermined value, an error signal is generated which indicates a fault or failure of either the control system or the object. Since the response delay of the object is known and is built into the model, false failure signals due to such delay are avoided even though there may initially be a large deviation between the commanded output of the object and its actual output.

A mathematical model usually cannot exactly duplicate the characteristics of a control system and object, particularly during transient as opposed to steady state operation. Furthermore, a model of fixed configuration cannot account for characteristic changes due to deterioration of the control system and its object with time, which is also more of a problem during transient operation. A high failure threshold is, therefore, required so as not to falsely signal a failure due to inaccuracies of the model. The more complex the control system, the greater will be the inaccuracies of the model during transient control system operation, and the higher the required failure threshold. Put another way, the simpler the model, the larger the expected deviation between its output and the actual output (at least during transient control system operation) even when there is no failure, thus requiring the use of a higher failure threshold. A high failure threshold may increase the time it takes to detect a true fault since the system will have to ignore larger output deviations.

A further undesirable feature of some prior art failure detection systems is that a large, unpredictable, but only temporary output deviation which may be caused by poor model simulation may trigger an improper fault signal.

The prior art, as represented by U.S. Pat. Nos. 4,213,175 and 4,214,301, has developed a complex method for avoiding some of the foregoing problems by using fault detection systems which continuously correct the model as the operating characteristics of the control system and object change with time, such as due to deterioration of components. It is desirable, however, to use the simplest model possible and to avoid the complexities of a model correcting system, and to still reduce the possibility of sending false failure signals and to increase the sensitivity of the system to faults which produce only relatively small deviations from normal output.

Several other patents relating to the general subject matter of the present invention and which may be of interest are Nos. 3,221,230; 3,394,294; 3,446,946; 3,680,069; 3,902,051; 3,974,364; and 4,092,716.

DISCLOSURE OF INVENTION

Accordingly, it is an object of the present invention to provide a failure detecting system for a control and object which is sensitive to normal operating tolerances and which can detect failures which produce deviant behavior of either a large or relatively small nature.

Another object of the present invention is a failure detection system which is tolerant of temporary deviant behavior. A further object of the present invention is a failure detection system which is sensitive to minor abnormal behavior yet does not instantly trigger a failure signal for such behavior.

Yet another object of the present invention is a failure detection system which can use a relatively simple model of the control system and still retain its sensitivity to small faults without triggering false failure signals due to large, but only temporary differences between the model and object output.

According to the present invention, a fault detecting system comprises a model simulating the input/output characteristics of apparatus being monitored which apparatus includes a control and the object of the control, said fault detection system receiving the same input as the apparatus, said system including means for comparing the model output to the actual output of the apparatus and means for integrating, over time, difference between the outputs which are outside a predetermined deadband and for generating a failure signal when the integral exceeds a predetermined value, and means for resetting the value of the integral to zero whenever the difference between the outputs falls between predetermined limits which are indicative of normal steady state operating tolerances.

More specifically, in this invention, a mathematical model is used to simulate the input/output characteristics of the control system and its object. The model output and the object output are compared, and an error signal which is representative of the difference between the outputs is calculated. The absolute value of error signals outside a predetermined deadband are integrated over time. The deadband allows the integrator to ignore errors up to a value which is considered likely to be the result of normal behavior rather than a fault in the system. When the value of the integral exceeds a predetermined amount, a failure signal is generated. Additionally, each time the error signal falls within a predetermined range which is considered to be normal for steady state operation, the integral of the error signals is reset to zero, cancelling out the effects of all preceeding error signals. As is more fully explained hereinbelow, the deadband range, which determines whether an error signal will be integrated, must be either the same as or wider than the normal steady state range which determines whether the integral is to be reset.

Because the mathematical model also simulates the response delay of the object of the control, such response delays produce only small error signals which are within the deadband. By integrating the error signals, temporarily high error signals (which may be the result of imprecision in the model simulation rather than due to failure of the control system), unless exceedingly large, will not immediately trigger a failure signal; and the effect of such a high error signal on the failure detection system will be cancelled by the integral resetting device if the object output quickly returns to a normal steady state condition. Furthermore, small error signals outside of the predetermined limits (i.e., the deadband)

will be tolerated for a longer period of time than large error signals, giving the control system and object a longer period of time to return to normal behavior without triggering a failure signal. By setting the normal steady state error signal range wide enough, normal component wear and tear over a predetermined time period can also be accounted for, and false failure signals due to this normal deterioration of components will not occur.

The foregoing and other objects, features and advantages of the present invention will become more apparent in the light of the following detailed description of preferred embodiments thereof as shown in the accompanying drawing.

BRIEF DESCRIPTION OF THE DRAWING

The sole FIGURE is a block diagram depicting failure detection apparatus according to the present invention.

BEST MODE FOR CARRYING OUT THE INVENTION

In the FIGURE, a failure detection system 10 is designed to detect malfunctions in a control system 12. The control system 12 is a system for setting and correcting the position (i.e., output) of an actuator 14 (the object) in accordance with an actuator position request 16 which is the input or a command to the control system 12. The actuator is schematically shown, via the dotted line 18, as being part of a variable area exhaust system 20, whereby movement of the actuator 14 causes nozzle flaps 22 to move in a predetermined manner.

The control system 12 operates on a continuous basis in the following manner: the current actuator position request 16 is fed to a comparator or summing junction 24 along with the actual position of the actuator 14 which is represented by a position feedback signal 26. The desired gain is applied to the signal 30 from the summing junction 24, and an operating signal 32 thereupon continuously corrects the position of the actuator 14, all of which is well known in the art.

The failure detection system 10 includes a mathematical model 34 which has input/output characteristics which simulate the input/output characteristics of the control system 12. Models of this type are well known in the art. The model 34 receives the same input as the control system 12, which is the actuator position request 16, and provides an output 36 which is a prediction of the present actual position of the actuator 14. A simple model can provide very accurate predictions for steady state conditions and usually less accurate predictions for transient operation. Steady state means the position request 16 is not changing with time; and transient operation means the position request 16 is changing with respect to time. Increased model complexity can improve the accuracy of predictions for transient operation.

The predicted position of the actuator 14 (from the model 34) and the position feedback signal 26 are both fed to a summing junction 38 which calculates the difference between the two and produces an error signal 40 which is representative of that difference. The error signal 40 is passed through an absolute value function 42 which includes a deadband between the values −a and +b. Those error signals 40 outside the deadband are thereby converted to error levels e (see the Drawing) and fed to an integrator 44 which integrates the error levels over time. A signal 46 representative of the present value of the integral is fed to a judging device 48 which triggers a failure signal 50 when the integral reaches a predetermined threshold value which is indicated in the Drawing as f.

The error signal 40 from the summing junction 38 is also fed to a resetting device 52 which determines whether the error signal 40 is within or outside a predetermined value range whose limits are herein designated by the values −c and +d. Whenever the value of the error signal 40 falls within that range a signal 54 is sent to the integrator 44 which resets the integral to zero. The critical range −c to +d represents the limits of normal (i.e., proper) steady state operation, and is preferably wide enough to account for increased error signal values due to expected apparatus wear and tear over a predetermined period of time. Generally speaking, significant imprecision in the predictions of mathematical models only occurs during transient control system operation, since even relatively simple models can very accurately simulate steady state conditions. Because the resetting device is only really concerned with steady state operation, it is essentially independent of how accurate the model is during transient control system operation. On the other hand, the absolute value function 42 is affected by how well the model simulates the characteristics of the control during transients, since these inaccuracies are transferred to the integrator 44. In prior art systems these inaccuracies are accommodated by raising the failure threshold level to avoid false failure signals. Consequently prior art systems are not sensitive to small levels of truly deviant control behavior.

The present failure detection system allows the use of relatively simple models with relatively high inaccuracies in simulating transient operating conditions without the need to be insensitive to low values of error signals. The deadband may, for example even be the same as the critical steady state range −c to +d. In that case any error signal value outside the narrow steady state range is integrated, but does not immediately trigger a failure signal. If that error signal value is due to an inaccuracy in the model prediction during transient control system operation (rather than being due to a true failure), then as soon as the control system returns to steady state operation the resetting device will reset the integral to zero, and a false failure signal will be avoided. If the error is caused by a real failure within the control system, the likelihood of the error signal value returning to within normal steady state values is very small; and integration of the error levels e will continue until the failure signal is triggered. Note that by integrating the value of the error level, small errors outside of the deadband will need to continue for longer periods of time than larger errors before a failure signal is triggered. This is advantageous since small error levels outside of the deadband are less likely to be the result of a fault or impending failure in the control system 12 than are large error levels and can, in any event, be tolerated for longer periods of time. Thus, when the error levels are small, more time is allowed for the system to return to within normal steady state tolerances before a failure signal is triggered.

Of course, it may be desirable or necessary to have the deadband width wider than the critical steady state range if the model simulation inaccuracies of the control system during transient operation are too great. This wider deadband range will still have outside limits less than the failure threshold levels of prior art systems which use models of similar accuracy.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A system for detecting the failure of apparatus, said apparatus including control means and an object of said control means, said system comprising:
   model means simulating the input/output characteristics of said apparatus;
   means for providing the same input to said apparatus and to said model means;
   means for continuously comparing the output of said object to the apparatus input and for operating on said object to eliminate any difference between the compared input and output;
   means for continuously comparing the output of said object to the output of said model means and for calculating error signals corresponding to the differences therebetween;
   means for integrating, over time, the absolute value of said error signals which are outside a predetermined deadband having limits $-a$ and $+b$;
   means for generating a failure signal when said integral exceeds a predetermined value; and
   means for resetting said integral to zero whenever the value of the error signal is within predetermined limits $-c$ and $+d$, where the absolute value of c is less than or equal to the absolute value of a, and the absolute value of d is less than or equal to the absolute value of b.

2. The system according to claim 1 wherein a equals c and b equals d.

3. The system according to claim 1 or 2 wherein said predetermined limits $-c$ and $+d$ are the limits of normal steady state operating tolerances.

4. A method for detecting the failure of apparatus, said apparatus including control means and the object of said control means, including the steps of:
   providing a model whose input/output characteristics simulate the input/output characteristics of said apparatus;
   providing the same input to said apparatus and to said model;
   continuously comparing the output of said object to the apparatus input and for operating on said object to eliminate any difference between the compared input and output;
   continuously comparing the output of said model to the output of said object and generating error signals corresponding to the difference therebetween;
   integrating, over time, the absolute value of those error signals outside a predetermined deadband having limits $-a$ and $+b$;
   generating a failure signal when the integral of the error signals exceeds a predetermined value; and
   resetting the integral to zero whenever the value of the error signal is within the predetermined limits $-c$ to $+d$, which limits are the same as or within said deadband limits $-a$ and $+b$.

5. The method according to claim 4 wherein said predetermined limits $-a$ and $+d$ are the limits of normal steady state operating tolerances.

6. The method according to claim 4 or 5 wherein said control means continuously compares the output of said object to the input to said apparatus and operates on said object to eliminate any difference between the compared input and output.

* * * * *

UNITED STATES PATENT AND TRADEMARK OFFICE
CERTIFICATE OF CORRECTION

PATENT NO. : 4,509,110

DATED : April 2, 1985

INVENTOR(S) : ADELARD LEVESQUE, JR. and JOHN P. REMBOLD

It is certified that error appears in the above-identified patent and that said Letters Patent is hereby corrected as shown below:

Column 6, Line 31    after "limits" change "-a" to -- -c --

Column 2, Line 50    after "all" change "preceeding" to -- preceding --

Signed and Sealed this

Ninth Day of July 1985

[SEAL]

Attest:

DONALD J. QUIGG

Attesting Officer    Acting Commissioner of Patents and Trademarks